(12) United States Patent
Fritzmeier et al.

(10) Patent No.: US 9,029,121 B2
(45) Date of Patent: May 12, 2015

(54) METHOD AND PRODUCT FOR DECOMPOSING ORGANIC COMPOUNDS

(75) Inventors: Ursula Fritzmeier, Grosshelfendorf (DE); Robert Mallee, Berlin (DE); Achim Wiessler, Melle (DE)

(73) Assignee: Total Marketing Services, Puteaux (FR)

( * ) Notice: Subject to any disclaimer, the term of this patent is extended or adjusted under 35 U.S.C. 154(b) by 500 days.

(21) Appl. No.: 13/378,556

(22) PCT Filed: Jun. 15, 2010

(86) PCT No.: PCT/EP2010/003575
§ 371 (c)(1),
(2), (4) Date: Mar. 2, 2012

(87) PCT Pub. No.: WO2010/145797
PCT Pub. Date: Dec. 23, 2010

(65) Prior Publication Data
US 2012/0156759 A1   Jun. 21, 2012

(30) Foreign Application Priority Data

Jun. 15, 2009 (DE) .......... 10 2009 024 916

(51) Int. Cl.
| C12N 1/21 | (2006.01) |
| C12N 1/14 | (2006.01) |
| C12N 1/16 | (2006.01) |
| C02F 1/68 | (2006.01) |
| C02F 3/34 | (2006.01) |
| A62D 3/02 | (2007.01) |
| C02F 101/32 | (2006.01) |
| C02F 103/00 | (2006.01) |

(52) U.S. Cl.
CPC . C02F 1/682 (2013.01); C02F 3/34 (2013.01); C02F 3/343 (2013.01); C02F 3/344 (2013.01); C02F 3/348 (2013.01); C02F 2101/32 (2013.01); C02F 2103/007 (2013.01)

(58) Field of Classification Search
CPC ............ C02F 1/682; C02F 3/34; C02F 3/343; C02F 3/344; C02F 3/348; C02F 2101/32; C02F 2103/007

USPC .......... 435/252.1, 253.3, 254.1, 254.5, 256.3, 435/262, 266, 271

See application file for complete search history.

(56) References Cited

U.S. PATENT DOCUMENTS

| 3,714,063 | A | 1/1973 | Salomone |
| 4,146,470 | A | 3/1979 | Mohan et al. |
| 4,830,759 | A | 5/1989 | Charlier |
| 5,051,192 | A | 9/1991 | Charlier |
| 6,190,646 | B1 | 2/2001 | Tellier et al. |
| 2003/0150801 | A1 | 8/2003 | Ward et al. |
| 2008/0312122 | A1 | 12/2008 | Werner |

FOREIGN PATENT DOCUMENTS

| CA | 2 229 761 C | 9/1998 |
| EP | 0 254 704 A1 | 1/1988 |
| EP | 0 398 860 A2 | 11/1990 |
| EP | 1 113 863 B1 | 1/2005 |
| GB | 1 354 543 | 5/1974 |
| GB | 2 115 311 A | 9/1983 |
| WO | WO 2004/022494 A1 | 3/2004 |

OTHER PUBLICATIONS

Oboh et al., 2006. Hydrocarbon Degrading Potentials of Bacteria Isolated from a Nigerian Bitumen (Tarsand) Deposit. Nature and Science, vol. 4, No. 3, pp. 51-57.*

Margesin et al. 2001. Biodegradation and bioremediation of hydrocarbons in extreme environments. Applied Microbilogy Biotechnology, 56, pp. 6650-6663.*

Nov. 26, 2010 International Search Report issued in PCT/EP2010/003575.

* cited by examiner

Primary Examiner — Jon P Weber
Assistant Examiner — Kailash C Srivastava
(74) Attorney, Agent, or Firm — Oliff PLC

(57) ABSTRACT

A method for the biological decomposition of organic compounds of the group of hydrocarbons, fats, oils, waxes, and derivatives thereof as well as mixtures thereof in media polluted therewith, in the presence of at least one dispersant, wherein the medium polluted with the pollutants is treated with at least one dispersant and with microorganisms.

13 Claims, 1 Drawing Sheet

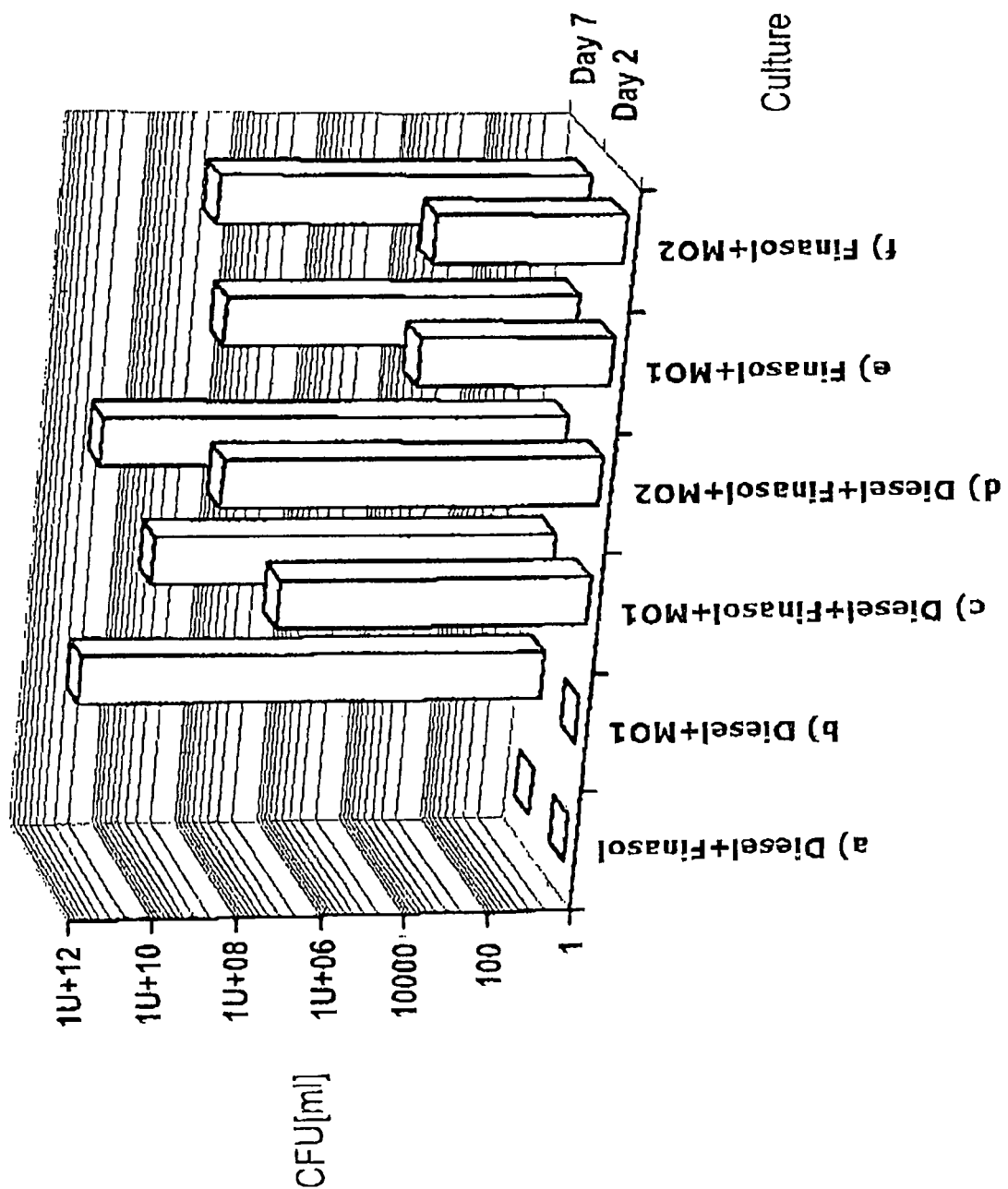

METHOD AND PRODUCT FOR DECOMPOSING ORGANIC COMPOUNDS

FIELD OF THE INVENTION

The present invention relates to the field of the biological decomposition of organic compounds in media polluted therewith. The invention relates in particular to a method for the biological decomposition of organic compounds of the group of hydrocarbons, fats, oils, waxes, and derivatives thereof as well as mixtures thereof in polluted media, to a product to be used in this method, and to a number of possible applications of the method and of the product.

BACKGROUND OF THE INVENTION

Very wide-spread classes of organic compounds are hydrocarbons which include in particular petroleum. Petroleum consists of a mixture of hydrocarbons, sulfur compounds, heterocyclic compounds, etc. These different substances vary substantially with respect to their properties. The behavior of petroleum in the environment depends on the physical properties thereof, such as boiling point and water solubility, the chemical properties, such as chemical and photochemical decomposability and toxicity, and the biological properties which include biological decomposability and bio accumulation ability.

Petroleum that gets into the marine environment will first of all float on the water surface since its specific weight is smaller than that of sea water, and will form a more or less thick oil film there. By means of wave movements and flows, a horizontal trans-port on the water takes place in which the oil moreover spreads across the area. As a function of the physical and chemical properties, parts of the oil film transit to the adjacent environment compartments such as air and water. The extent and the rate of these transitions depend decisively on the prevailing environmental conditions such as, for instance, wind, waves, and temperature. The higher the temperature, the greater the wind strength and the higher the waves, the larger the share of oil that evaporates or dissolves. Apart from these processes, however, some oil components floating on the water surface may also be decomposed chemically and photochemically. The major portion of the oil is in addition subject to a biological decomposition by autochthonous, specific oil-decomposing bacteria.

In other ecological regions, for instance, in soil, accidents occur time and again during the exploitation, the transportation, the processing, and the storage of oil or oil products, wherein larger amounts of oil or oil products emanate from the pipelines, transporters, or containers intended for them and contaminate the surrounding soil. Here, too, the problem arises that the oil contaminations modify their state under the influence of the atmospheric conditions in that easily volatile components evaporate and the remaining, high-boiling and viscous components increasingly clump together and resinify. In the course of time, the oil in addition penetrates at various depths into the soil with serious groundwater contamination being able to occur.

A number of methods for the conversion of petroleum products have already been known. Thus, GB 1 354 543 describes, for instance, a method for converting a petroleum product to a biologically decomposable emulsion by mixing a specific microorganism nutrient solution and an organic acid in water. Micro emulsions containing surfactants are known from EP 1 113 863 B1. These micro emulsions act as accelerators for the biological decomposition of hydrophobic pollutions, for instance, hydrocarbons. A composition on the basis of surfactants for the dispersion of hydrocarbons in water, in particular in sea water, is described in GB 2 115 311 A. Finally, CA 2 229 761 C describes a method for the biological decomposition of a sludge on oil basis containing a mixture of petroleum hydrocarbons. This method takes place in a reactor, wherein an aqueous solution is formed from an oil-in-water emulsion of the sludge on oil basis, a bacterial culture, and nutrients for the bacterial culture. This aqueous solution may contain a surfactant.

The use of a dispersant against oil pollutions in particular in marine areas results in a dissolution of the oil layer into very many little droplets, so that the oil surface increases and decomposing processes by available bacteria are enhanced. Thereby, the autochthonous flora of the respective location is used. According to experience, this is, however, frequently not very lavish and, above all in acute cases, not adapted to the location. Hence, there may arise substantial disturbances in the ecological system. It is especially important to contain the effects of oil catastrophes on the marine environment and also on such areas that are strongly contaminated by oil contamination, for instance, soils.

Substantial damages to the environment also result from the contamination with fats, oils, waxes, and derivatives thereof. In many areas, fats, oils, waxes, and derivatives thereof which may disturb the ecological balance are often discharged. Here, too, there exists considerable demand of removing such contaminations with ecologically compatible solutions.

It is therefore an object of the present invention to provide a technology by means of which the decomposition of contaminants in media polluted with organic compounds is performed in an accelerated manner in an ecologically acceptable way, wherein such environments may be treated which have only a weak and unadapted populating by autochthonous microorganisms.

It is also an object of the present invention to provide a product by which the user is capable of quickly and practically treat the pollution by means of organic compounds directly on the spot.

SUMMARY OF THE INVENTION

The object of the invention is solved by the method with the features of claim 1 and by the combination product according to claim 19. Advantageous developments of the method and of the product result from the subclaims which further develop the idea of the present invention.

The present invention describes in a first aspect a method for the biological decomposition of organic compounds of the group of hydrocarbons, fats, oils, waxes, and derivatives thereof as well as mixtures thereof in media polluted therewith, in the presence of at least one dispersant, characterized in that the medium polluted with the organic compounds is treated with the at least one dispersant and with microorganisms.

The biological decomposition of the organic compounds in media polluted therewith is substantially accelerated by the method according to the invention. The application with at least one dispersant results in a dissolution of the organic compounds into many small droplets (micelles), so that decomposition processes, for instance, by bacteria, are promoted. The addition of the microorganisms results in a surprising manner in an increased microbial progeny rate of the microorganisms that are capable of quickly influencing the pollutant and of accelerating its decomposition.

In accordance with a second aspect of the invention, a combination product is provided which comprises a dispersant source and a microorganisms source. This combination product enables quick acting in the case of a suddenly occurring pollution with organic compounds in aqueous and non-aqueous media.

In a third aspect of the present invention, the method and the combination product are used in aqueous and non-aqueous media polluted with organic compounds.

SHORT DESCRIPTION OF THE DRAWING

The only FIGURE shows a block diagram for explaining the micro biological growth in various cultures.

DETAILED DESCRIPTION OF THE PRESENT INVENTION

The method according to the invention is a method that renders it possible to effect, even in media that are only weakly populated with autochthonous microorganisms, an accelerated decomposition of pollutants based on organic compounds. The method according to the invention may even be performed advantageously if the local microorganism flora is normally not or just slowly self-decomposable.

The combinatory use of at least one dispersant and of the microorganisms is, depending on the kind and degree of contamination, performed in a two-step mode. In a preferred embodiment of the method according to the invention, the dispersant is first put in the medium polluted with the organic compounds, and subsequently the microorganisms are added. In another preferred alternative of the method according to the invention, the microorganisms are first put in the medium polluted with the organic compounds, and subsequently the dispersant is added.

It is further also possible to use microorganisms and dispersant simultaneously.

The hydrocarbons to be decomposed by means of the method according to the invention are preferably oils and oil products such as, for instance, petroleum distillates, mainly the heavy distillates containing heavy polyaromatic compounds, their derivatives and further processed products. These petroleum products and derivatives are, as a rule, not self-decomposable if they get into the environment. Thus, the most important criterion is the biological decomposability of these petroleum products. It determines the residence time in the environment. The quicker decomposition takes place, the less is the probability of accumulation or the effect of possible toxic properties.

By means of the method according to the invention, such organic compounds that rank among the fats, oils (fat oils), waxes, and derivatives thereof are also decomposed biologically. These are fats, oils, and waxes of herbal and animal origin. Synthetic fats, oils, and waxes are also included. Furthermore, mixtures of fats, oils, and waxes are also comprised.

In a preferred embodiment of the method according to the invention, at least one surfactant is used as a dispersant, said surfactant being preferably selected from ionic, non-ionic, and amphoteric surfactants, but often mixtures thereof. The dispersant present an HLB value, which is a Hydrophylic Lipophylic Balance, of about 8 to 10.

The ionic surfactants comprise anionic and cationic surfactants. Anionic surfactants are, for instance, soaps, carboxylates, sulfonates, and, sulfates. The cationic surfactants comprise, for instance, amine salts and quaternary ammonium compounds.

Examples of non-ionic surfactants that may be used are ethoxylates, sucrose esters, aminoxides. Amphoteric surfactants that may be used are, for instance, betaines and sultaines.

In a particular embodiment of the method according to the invention, the dispersant comprises:
  about 40 to 65 wt % surfactant combination comprising
    a) a blend of sorbitan monooleate and sorbitan monooleate polyoxyethylene adduct, having an HLB of about 8.75 to 9.5,
    b) eventually a blend of sorbitan trioleate and sorbitan monooleate polyoxyethylene adduct having an HLB of about 8 to 10, wherein the weight ratio of the blend (a) to the blend (b) is within the range of about 0.5:1 and 6:1,
  about 35 to 60 wt % wetting agent comprising at least one surface active water dispersable dialkysulfosuccinate, said percentage being based on dry salt.

In preferred embodiment, the dispersant is used in admixture with petroleum distillates. More preferably, the dispersant is used in admixture with water and light distillate, the final composition containing from 25 to 60% dispersant, 1 to 20% water and 5 to 74% light distillate.

Light distillate means dearomatized kerosin, in all or in part with polyalcoholic ethers, preferably polyalkylglycol ethers. Most relevant dispersants are disclosed by reference to patents EP254704 and EP 398860. Preferred dispersants are FINASOL OSR51 and FINASOL OSR52 available commercially available by Total Fluides.

Generally, the dispersant is added to the medium polluted with the organic compounds in such an amount that it can sufficiently be dispersed. It has turned out in practice that the dispersant is used in a concentration of 1 to 10%, relating to the amount of the organic compounds in the polluted medium. In a particularly preferred embodiment, the dispersant is used in a concentration of 3 to 7%, relating to the amount of the organic compounds in the polluted medium.

In accordance with the method of the invention, the microorganisms are added to the polluted medium in the form of an aqueous solution. These microorganisms contribute substantially to the fact that the decomposition rate of the pollutant is accelerated.

As microorganisms, bacteria, yeasts, fungi, and mixtures thereof may be used in the method according to the invention. Furthermore, mixtures of bacteria, yeasts, and fungi among each other are also possible.

In the method according to the invention, cells of the genera *acinetobacter, alicaligenes, bacillus, pseudomonas, alcanivorax, cycloclasticus, marinobacter, neptunomonas, oleiphilus, oleispira,* and/or *thalassolitus* are preferably used as bacteria. Preferred cells are those of the stems *Pseudomonas marginalis, P. grimontii, P. veronii* and *P. azotoformans* in aqueous solution.

Examples of fungi to be used in accordance with the invention are cells of the genera *phanerochaete, aspergillus, penicillium, fusarium, amorphoteca, neosartorya, paleomyces, talaromyces,* and/or *graphium*, prepared in aqueous solution ("submerse culture"). A preferred genus is *Penicillium*.

Preferred yeasts are cells of the genus *candida*.

In a preferred embodiment of the method according to the invention, the microorganisms are used in a concentration of $10^3$ to $10^{15}$ CFU/ml, related to the amount of organic compounds in the polluted medium. In a particularly preferred embodiment, the microorganisms are used in a concentration of $10^7$ to $10^{12}$ CFU/ml, related to the amount of hydrocarbons in the polluted medium.

In practice, there are various possibilities of application of the dispersant and the microorganisms on the polluted medium. In a preferred embodiment of the present invention, the dispersant and the microorganisms are sprayed on alone one after the other or together. In the case of larger contaminated areas it is possible to apply either efficiently by airplanes or from boats. In the case of smaller contaminated areas, the use of hand-held sprayers is sufficient.

Another possibility consists in applying the microorganisms and the dispersant with a dosing pump onto the contaminated areas.

Depending on the kind and degree of medium contamination with the organic compounds, the addition of the microorganisms and/or the dispersant may be performed directly or time-delayed one after the other on the polluted medium. In some case the microorganisms are sprayed first, in other case, the dispersant is sprayed first.

The polluted media adapted to be treated with the method according to the invention are aqueous and non-aqueous areas, surfaces, and punctually polluted locations.

The aqueous media comprise, for instance, polluted open seas, inland waters, cisterns, and waste water treatment plants.

Non-aqueous media suited to be treated with the method according to the invention relate to polluted areas and surfaces such as, for instance, soils in contaminated industrial sites, gas stations, and gastronomy sites.

In the present case of the treatment of non-aqueous media, care has to be taken that a corresponding amount of aqueous medium, e.g. water, is available to obtain a field capacity of approximately 50% in non aqueous media. The man skilled in the art is able to determine the necessary amount of aqueous medium needed and to use it correspondingly to provide the optimal media moisture. It will also depend on the degree of the contamination and on the nature of the organic compounds that caused this contamination.

The present invention also describes a combination product comprising a dispersant source and a microorganisms source as components.

The dispersant source of the combination product is a surfactant selected from ionic, non-ionic, and amphoteric surfactants as well as mixtures thereof. Examples of ionic, non-ionic, and amphoteric surfactants have already been described above.

In a preferred embodiment of the combination product according to the invention, the dispersant source contains one or more dispersant (s) which is/are available as a mixture with light distillate and possibly water. Preferred mixtures or examples, respectively, have already been mentioned initially.

In the combination product, the microorganisms source contains microorganisms which are preferably available as a solution, for instance, in an aqueous solution. The microorganisms are selected as a function of the kind of contamination with the organic compounds, the degree of contamination, and the size of the contaminated area. They are selected from bacteria, yeasts, fungi, and mixtures thereof. Bacteria mixtures are preferred. Examples of preferred bacteria, yeasts, fungi for the bacteria solution or the bacteria material, as microorganisms source, have already been disclosed above.

The method according to the invention and the combination product according to the invention may be used successfully in aqueous and non-aqueous media for the efficient decomposition of organic compounds in contaminated areas, these organic compounds being of the group of hydrocarbons, fats, oils, waxes, and derivatives thereof as well as mixtures thereof. It was found that the dispersant according to the invention favours the availability for the microorganisms either in the micelle or about the micelle. After all, the decomposition rate of the pollutant is substantially increased by the addition of the microorganisms.

The method and the combination product according to the invention is very successful for open seas, inland waters, cisterns, and waste water treatment plants which are deeply polluted or contaminated by organic compounds, specifically heavy polyaromatic compounds which remain after evaporation of lighter hydrocarbon compounds. The method and the combination product according to the invention may especially be used in an extremely efficient manner in the case of oil tanker damages or oil platform damages so as to fight the effects of oil accidents and to preserve the ecological system.

The method and the combination product according to the invention may also be used in non-aqueous media polluted with organic compounds. Examples of non-aqueous media are polluted areas and surfaces, such as soils in contaminated industrial sites, e.g. junk yards, old chemical or petroleum industrial sites, tank farms, gas stations, and gastronomy sites.

The present invention will now be explained in detail by means of the examples, wherein the examples are in no way suited to restrict the present invention only to the embodiments described there.

EXAMPLES

Example 1

For the illustration of the microbial growth on a defined carbon source, a minimal medium without carbon source was generated:

| | |
|---|---|
| $Na_2HPO_4$ | 7.2 g |
| $KH_2PO_4$ | 3.0 g |
| NaCl | 0.5 g |
| $NH_4Cl$ | 1.0 g |
| Dist. water | 1000 ml |

The solution was set to a value of pH 7.4 with NaOH or HCl, respectively. After the autoclaving,

| | |
|---|---|
| 1M $MgSO_4$ | 2.0 ml |
| 2M $CaCl_2$ | 0.1 ml | were added.

The medium was distributed to six cultures with 200 ml in suitable containers.

As microorganisms, two different microorganism mixtures MO1 (aqueous solution containing *Pseudomonas azotoformans, P. grimontii* and *P. marginalis*) and MO2 (aqueous solution containing *Penicillium* sp. and *Pseudomonas azotoformans, P. grimontii* and *P. marginalis*) by the company Inocre® were used. The consortia (Mo1 and MO2) of the microorganisms were produced as follows: The stems described above were grown in mineral medium (minimal medium see above with 1% (wt) fructose as carbon source) as pure cultures up to cell numbers of more than $10^8$ CFU/ml The pure cultures were mixed together in equal quantities.

The microorganism mixtures were set to cell numbers in the range of $10^8$ to $10^9$ CFU/ml in aqueous solution.

Diesel oil in a concentration of 1% (v/v) in the minimal medium was used as a carbon source and simulation for the hydrocarbon contamination.

As a dispersant available in admixture with light distillate, Finasol OSR 52 (Total Fluides) was added to the minimal medium in a concentration of 5% (w/v) (50 g Finasol OSR 52 per 1000 ml minimal medium).

Example 2

Cultures with 200 ml minimal medium each were produced. Depending on the problem, the following components were added:
a) To determine the effect of Finasol only on a diesel oil layer, a culture was polluted with 2 ml diesel oil and subsequently sprayed with 0.1 g (5% (w/v)) Finasol.
b) To test the effect of the microorganism mixture 1 (MO1) only on diesel oil, a culture was polluted with 2 ml diesel oil and subsequently sprayed with 0.1 ml of MO1 with $10^8$ CFU/ml in aqueous solution.
c) To test the joint effect of Finasol and MO1 on diesel oil, a culture was polluted with 2 ml diesel oil, sprayed with 0.1 ml MO1 ($10^8$ CFU/ml in aqueous solution), and subsequently superimposed with 0.1 g Finasol.
d) To test the joint effect of Finasol and a second microorganism mixture (MO2) on diesel oil, a culture was polluted with 2 ml diesel oil, sprayed with 0.1 ml MO2 ($10^9$ CFU/ml), and subsequently superimposed with 0.1 g Finasol.
e) To determine whether Finasol is microbiologically decomposable, 0.1 g Finasol and 0.1 ml MO1 ($10^8$ CFU/ml) were added to a culture without diesel oil.
f) To determine whether Finasol is microbiologically decomposable, 0.1 g Finasol and 0.1 ml MO2 ($10^9$ CFU/ml) were added to a culture without diesel oil.

The cultures were incubated under stirring for one week. The samplings for the determination of the microbiological growth took place on day 2 and on day 7.

Example 3

The interpretation of the experiments took place pursuant to visual parameters and by the determination of the microbiological growth. Microbial growth is quantified as colony forming units (CFU/ml), see FIG. 1

1. Visual Evaluation
   The visible effects of the experiments were documented on day 2 and day 7. The following resulted for the various cultures:
a) Day 2: distinct clouding, corresponding to fine diesel oil droplets distribution obtained by Diesel dispersion in presence of Finasol.
   Day 7 like day 2
b) Day 2: culture clear
   Day 7: distinct clouding, caused by the growth of MO1, sedimented biomass can be recognized.
c) Day 2: distinct clouding, corresponding to fine diesel oil droplets distribution obtained by Diesel dispersion in presence of Finasol.
   Day 7 like day 2
d) Day 2: distinct clouding, corresponding to fine diesel oil droplets distribution obtained by Diesel dispersion in presence of Finasol.
   Day 7 like day 2, but slight bio film can be recognized at the rim of the vessel.
e) Day 2: distinct clouding, corresponding to fine diesel oil droplets distribution obtained by Diesel dispersion in presence of Finasol.
   Day 7 like day 2
f) Day 2: distinct clouding, corresponding to fine diesel oil droplets distribution obtained by Diesel dispersion in presence of Finasol.
   Day 7 like day 2

By the visual evaluation, the dispersing properties of Finasol become very clear. The surface increase that is generated this way has a positive effect on the microbiological growth since a better availability of the carbons is thus given.

2. Microbiological Growth

The microbiological growth was tracked by the number of the colony forming units (CFU) on CASO Agar.

|  | a) Diesel + Finasol | b) Diesel + MO1 | c) Diesel + Finasol + MO1 | d) Diesel + Finasol + MO2 | e) Finasol + MO1 | f) Finasol + MO2 |
|---|---|---|---|---|---|---|
| Day 2 | 0 | 0 | $2.5 \times 10^7$ | $8.7 \times 10^8$ | $3.9 \times 10^4$ | $3 \times 10^4$ |
| Day 7 | 0 | $1.4 \times 10^{11}$ | $4 \times 10^9$ | $1.1 \times 10^{11}$ | $2.4 \times 10^8$ | $5.8 \times 10^8$ |

FIG. 1 illustrates the microbiological growth of the cultures a) to f) by means of the CFUs.

The cell number determination revealed that MO1 without Finasol is indeed absolutely capable of using the diesel oil as a sole carbon source and thus decomposing it (culture b). However, with a time delay only. If, however, the microorganisms are used in combination with Finasol, a strong growth is generated much more quickly. The decomposition rate is drastically increased by a joint use (cultures c and d). The biological decomposability of Finasol by the microorganism mixtures is also given. The microorganisms, however, require as desired at least the duration of one week to achieve efficient cell numbers (cultures e and f). Thus, the microorganisms have sufficient time to use the surface increase of Finasol to decompose the pollutant before the Finasol is also transformed.

Disclosed is a method for the biological decomposition of organic compounds of the group of hydrocarbons, fats, oils, waxes, and derivatives thereof as well as mixtures thereof in media polluted therewith, in the presence of at least one dispersant, wherein the medium polluted with the pollutants is treated with the at least one dispersant and with microorganisms.

The invention claimed is:
1. A method for biological decomposition of one or more organic compounds selected from the group consisting of hydrocarbons, fats, oils, waxes, and derivatives thereof in a non-aqueous medium polluted therewith, comprising:
   adding at least one dispersant having an Hydrophylic Lipophylic Balance (HLB) value of about 8 to 10 in a mixture with petroleum distillates to the medium; and subsequently adding a microorganism mixture comprising: microorganisms *Pseudomonas azotoformans, P. grimontii*, and *P. marginalis*; or *Penicillium* sp., *Pseudomonas azotoformans, P. grimontii*, and *P. marginalis* to the medium.
2. The method according to claim 1, wherein the dispersant comprises one or more surfactants selected from the group consisting of ionic, non-ionic, and amphoteric surfactants.

3. The method according to claim 1, wherein the dispersant comprises:
about 40 to 65 wt % of a surfactant combination comprising:
a) a blend of sorbitan monooleate and sorbitan monooleate polyoxyethylene adduct having an HLB of about 8.75 to 9.5; and
b) a blend of sorbitan trioleate and sorbitan monooleate polyoxyethylene adduct having an HLB of about 8 to 10, wherein the weight ratio of the blend (a) to the blend (b) is in a range of about 0.5:1 to 6:1; and
about 35 to 60 wt % of a wetting agent comprising at least one surface active water dispersable dialkysulfosuccinate, said percentage being based on dry salt.

4. The method according to claim 1, wherein the mixture comprises from 25 to 60% dispersant, 1 to 20% water, and 5 to 74% light distillate.

5. The method according to claim 4, wherein the light distillate is dearomatized kerosin, taken alone or in admixture with polyalcoholic ethers.

6. The method according to claim 4, wherein the polyalcoholic ethers comprise polyalkylglycol ethers.

7. The method according to claim 1, wherein the dispersant is in a concentration of 1 to 10 wt %, based on the total weight of the organic compounds in the polluted medium.

8. The method according to claim 7, wherein the dispersant is in a concentration of 3 to 7 wt %, based on the total weight of the organic compounds in the polluted medium.

9. The method according to claim 1, wherein the microorganism mixture comprises an aqueous solution of *Pseudomonas azotoformans, P. grimontii*, and *P. marginalis*; or an aqueous solution of *Penicillium* sp., *Pseudomonas azotoformans, P. grimontii*, and *P. marginalis*.

10. The method according to claim 9, wherein the microorganisms are in a concentration of $10^3$ to $10^{15}$ CFU/ml of polluted medium, based on the amount of the organic compounds in the polluted medium.

11. The method according to claim 10, wherein the microorganisms are in a concentration of $10^7$ to $10^{12}$ CFU/ml of polluted medium, based on the amount of the organic compounds in the polluted medium.

12. The method according to claim 1, wherein the dispersant and the microorganism mixture is sprayed on the polluted medium.

13. The method according to claim 1, wherein the non-aqueous medium comprises a polluted area or surface in a contaminated industrial site, gas station, or gastronomy site.

* * * * *